W. R. SWEET.
WOOD SCREW.
APPLICATION FILED SEPT. 29, 1915.

1,175,665.

Patented Mar. 14, 1916.

WITNESSES

INVENTOR
William Russell Sweet
BY
ATTORNEYS

UNITED STATES PATENT OFFICE.

WILLIAM RUSSELL SWEET, OF WAKEFIELD, RHODE ISLAND.

WOOD-SCREW.

1,175,665.      Specification of Letters Patent.      Patented Mar. 14, 1916.

Application filed September 29, 1915. Serial No. 53,170.

*To all whom it may concern:*

Be it known that I, WILLIAM RUSSELL SWEET, a citizen of the United States, and a resident of Wakefield, in the county of Washington and State of Rhode Island, have invented a new and Improved Wood-Screw, of which the following is a full, clear, and exact description.

The object of the invention is to provide a new and improved wood screw which is simple in construction, easily screwed into wood or other material and arranged to lock the screw against accidental unscrewing and to prevent water or moisture from leaking past the head of the screw into the material.

In order to accomplish the desired result, use is made of oblique grooves formed in the under side of the conical head of the screw and extending onto the upper end of the shank to provide shoulders or teeth for the wood material to pass into after the screw is screwed up to prevent accidental unscrewing of the screw, the grooves or teeth extending in a reverse direction to that of the thread on the shank of the screw.

A practical embodiment of the invention is represented in the accompanying drawings forming a part of this specification, in which similar characters of reference indicate corresponding parts in both views.

Figure 1:
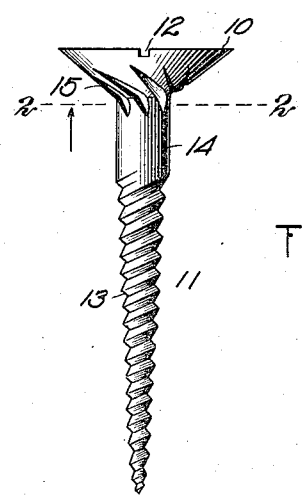
Figure 2:
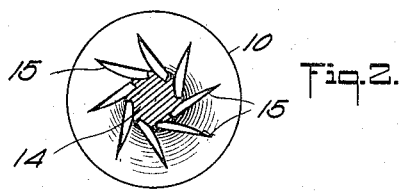

Figure 1 is a side elevation of the screw; and Fig. 2 is an inverted sectional plan view of the same on the line 2:2 of Fig. 1.

The wood screw in its general construction consists of a conical head 10 and a tapering shank 11, of which the head 10 is provided with the usual drive slot 12 and the shank 11 is provided with a thread 13 extending from the point of the screw to within a distance of the upper end of the shank thus leaving the upper portion 14 of the shank unthreaded. Grooves 15 are formed obliquely in the under side of the head 10 and terminate at their upper ends a distance from the top of the head 10, the lower ends of the grooves extending onto the upper unthreaded portion 14 of the shank 11, as plainly indicated in Fig. 1. The grooves 15 extend in a reverse direction to that of the screw and the said grooves 15 provide shoulders or teeth on the under side of the head 10 and on the upper portion of the shank 14 so that when the screw is screwed into the wood the wood material can readily extend into the grooves 15 thus abutting against the teeth or shoulders and thereby preventing accidental unscrewing of the screw. It will be noticed that by providing the head 10 and the shank 11 with grooves as described they do not interfere with the screwing of the screw into the wood but prevent accidental unscrewing of the screw. By terminating the upper ends of the grooves 15 a distance from the top of the head 10 the upper portion of the under side of the head is of unbroken continuity and hence water is not liable to pass under the head and injure the wood material.

Having thus described my invention, I claim as new and desire to secure by Letters Patent:

As an article of manufacture, a wood screw, comprising a conical head and a tapering shank provided with a screw thread extending from the point of the shank to within a distance from the upper end of the shank, the under side of the said head being provided with grooves extending obliquely in a reverse direction to that of the shank threads, the upper ends of the grooves terminating below the top of the head and the lower ends extending onto the upper end of the said shank approximately longitudinally thereof, the grooves having tapering ends with their widest portions at the inner end of the head, one wall of each groove being approximately vertical and facing in a direction opposite the direction in which the screw turns when being screwed into the material.

In testimony whereof I have signed my name to this specification in the presence of two subscribing witnesses.

WILLIAM RUSSELL SWEET.

Witnesses:
FRANK J. MUNSY,
W. H. B. ALLEN.

Copies of this patent may be obtained for five cents each, by addressing the "Commissioner of Patents, Washington, D. C."